US005320561A

United States Patent [19]

[11] Patent Number: 5,320,561

[45] Date of Patent: Jun. 14, 1994

Cook et al.

[54] CONNECTOR FOR PROVIDING PROGRAMMING, TESTING, AND POWER SIGNALS

[75] Inventors: Kenneth E. Cook, Lake Worth; Arthur L. A. Baker, Green Acres; Kenneth R. Warren, Lake Worth; Paul M. Bricketto, Boynton Beach; Allen D. Hertz, Boca Raton, all of Fla.

[73] Assignee: Motorola, Inc., Schaumburg, Ill.

[21] Appl. No.: 901,341

[22] Filed: Jun. 19, 1992

[51] Int. Cl.[5] ............................................ H04B 1/08

[52] U.S. Cl. .................................. 439/500; 455/186.1

[58] Field of Search .................. 439/55, 76, 500, 638; 455/86, 89, 90, 186.1, 186.2, 343

[56] References Cited

U.S. PATENT DOCUMENTS

| | | | |
|---|---|---|---|
| 3,740,698 | 1/1973 | Jerominek | 439/61 |
| 4,283,796 | 8/1981 | Hughes | 455/349 |
| 4,481,458 | 11/1984 | Lane | 439/929 |
| 4,548,082 | 10/1985 | Engebretson et al. | 73/585 |
| 4,771,399 | 9/1988 | Snowden et al. | 455/186.2 |
| 4,903,330 | 2/1990 | Ishiguro et al. | 455/186.1 |
| 5,188,540 | 2/1993 | Haertl et al. | 439/500 |

*Primary Examiner*—Neil Abrams

*Attorney, Agent, or Firm*—Keith A. Chanroo; Thomas G. Berry

[57] ABSTRACT

A connector (40) for insertion into a portable electronic device (30) provides testing, programming and power thereto. The portable electronic device (30) has a chassis (32) housed therein and further includes a battery cavity (35) with battery contacts (36) therein. The connector (40) has a distal end for contacting the chassis (32) through an access port (34) in the battery cavity (35). A proximal end of the connector (40) is adapted for connection to a cable. The connector (40) has a substrate (50) attached to a printed wire board (41), wherein the printed wire board (41) further comprises a first plurality of conductors (52) thereon for receiving data signals from the cable, and a second plurality of conductors (42) thereon for receiving power signals from the cable. A first plurality of contacts (48) are coupled to the first plurality of conductors (52) at the distal end of the connector (40) for contacting the chassis, and a second plurality of contacts (46) are coupled to the second plurality of conductors (42) at the distal end of the connector (40) for contacting the battery contacts.

17 Claims, 1 Drawing Sheet

CONNECTOR FOR PROVIDING PROGRAMMING, TESTING, AND POWER SIGNALS

FIELD OF THE INVENTION

This invention relates in general to a connector for accessing internal terminals of a selective call receiver for programming and testing functions, and more particularly, to a connector capable of providing programming and testing pins while simultaneously supplying power to the selective call receiver.

BACKGROUND OF THE INVENTION

Personal electronic devices, such as selective call receivers, continue to be in high demand. The market for these devices is increasingly competitive, and cost pressures are seen not only in the physical manufacture of such products, but also in tuning, testing and programming the products. Each selective call receiver is unique in that it makes use of a decoder which is programmed to make the selective call receiver responsive to a predetermined signal. Hence, each selective call receiver must have its decoder programmed individually. Early methods of programming, for example, required opening the selective call receiver housing and inserting a code plug or altering several connections therein. Disassembly was time consuming and presented an undue risk of damage.

Alternatively, an opening can be provided into which a plug-in control module can be inserted for electronically programming the selective call receiver's decoder. Selective call receivers, however, are often used in environments whereby unwanted foreign material could enter the opening, thus adversely affecting the selective call receiver.

An improved method of programming a selective call receiver decoder is described by Hughes in U.S. Pat. No. 4,283,796, whereby the decoder is programmed by removing a battery cover and battery and inserting a module therethrough for connection to the chassis. The decoder can thus be programmed without disassembly and the selective call receiver is not unduly exposed to foreign matter. Similarly, Ishiguro et al., in U.S. Pat. No. 4,903,330, provide access to a write terminal through the battery cavity. Accessing the chassis in the manner described in the cited art, however, requires removing the battery and supplying the required power for testing purposes via an alternate connection. Additionally, removing the battery, in some instances, changes the antenna loading conditions. This in turn, increases the difficulty of making accurate RF tuning adjustments and other testing measurements.

Programming and testing issues are exacerbated by the continuing decreased size of selective call receivers. Current selective call receivers can approximate the size of credit cards or fit within wrist-watches. Yet it is desirable to reduce costs by increasing the efficiency of programming and testing the selective call receivers in spite of the decreased available area for making connections thereto.

Thus, what is needed is a connector that provides access to a selective call receiver chassis for both programming and testing while simultaneously providing power with the appropriate antenna loading.

SUMMARY OF THE INVENTION

In accordance with the present invention, a connector for insertion into a portable electronic device is provided. The portable electronic device has a chassis housed therein and further includes a battery cavity with battery contacts. The connecter has a distal end for contacting the chassis through an access port in the battery cavity. A proximal end of the connecter is adapted for connection to a cable. The connector has a substrate attached to a printed wire board, wherein the printed wire board further comprises a first plurality of conductors thereon for receiving data signals from the cable, and a second plurality of conductors thereon for receiving power signals from the cable. A first plurality of contacts are coupled to the first plurality of conductors at the distal end of the connector for contacting the chassis, and a second plurality of contacts are coupled to the second plurality of conductors at the distal end of the connector for contacting the battery contacts.

DESCRIPTION OF A PREFERRED EMBODIMENT

Figure 1:
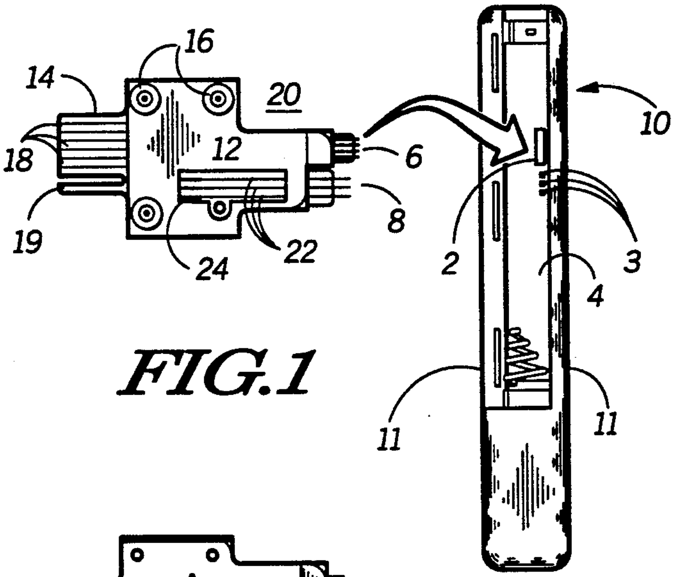
FIG. 1 is a pictorial diagram in accordance with a first embodiment of the present invention.

FIG. 1 depicts a selective call receiver 10 adapted to receive a connector 20 in accordance with a first embodiment of the present invention. After manufacture of the selective call receiver 10, it is necessary to program a decoder therein (not shown) to be responsive to a predetermined signal. Furthermore, an internal antenna (not shown) must be RF tuned and the selective call receiver 10 must be thereafter tested. The connector 20 is a thin leaded device which is inserted into the selective call receiver 10 for providing the programming, testing and powering connections thereto. The selective call receiver 10 is shown with its battery cover removed and having no battery present in a battery cavity 4. Access port 2 provides both access and guidance to a chassis within the selective call receiver 10 and is arranged in the battery cavity 4, behind the battery when the battery is present, hence the battery must be removed to engage the connector 20 thereto. The access port 2, 3 is comprised of two components: a rectangular cutout 2 which provides access to wire traces on a top surface of the chassis for providing programming signals and testing signals; and three holes 3 which allow pin type contacts access to an edge of the chassis for providing power and testing signals.

Due to the small size of the selective call receiver 10, access to the chassis is limited. In the past, due to this limited accessibility, power was supplied to the selective call receiver 10 via a separate power connector. Thus, for testing purposes, both a programming connection and a power/test connection is required. The connector 20 improves the efficiency of testing and programming the selective call receiver 10 by providing programming, testing, and power signals to the chassis in a single connector. FIG. 1 shows the top of the connector 20 having programming contacts 6 (typically resilient contacts) and power/test pins 8. A substrate 12 provides a base for the connector 20. The substrate 12 is non-conductive, and manufactured with suitable materials including, but not limited to, polycarbonate, ceramic, and urethane. The substrate 12 is shown mechanically attached to a double sided printed wiring board 14 by a plurality of screws 16. As is known to those skilled in the art, many other suitable forms of mechanical attachment are available, including, but not limited to riveting and gluing.

A portion of a top side of the printed wiring board 14 is visible in FIG. 1, wherein a plurality of wire traces 18, for supplying power, are available for snapping into a cable edge connector (not shown). The printed wiring board 14 includes a key 19 to permit the cable edge connector to be connected in only one orientation. An opening 24 is made available in the substrate 12 enabling a plurality of sockets 22 to be soldered to the plurality of wiring traces 18. During soldering, the sockets are held in place by the plurality of power/test pins 8 which pass though holes provided in the substrate 12. The holes run along the major axis of the printed wiring board 14 from the opening 24 and in the same direction as the sockets 22 such that the plurality of power/test pins 8 may pass therethrough for connecting to the sockets. As a result, the plurality of wiring traces 18 transfer power and test pulses from a ribbon cable edge connector, and the power and test pulse are transferred via the plurality of sockets 22 to the plurality of power/test pins 8.

The plurality of power/test pins 8 as used in this embodiment are spring loaded round ended pins, also known as pogo pins. The power/test pins 8 are slipped through the holes snapping into the respective sockets. In the event a pin is damaged during programming or testing, the damaged pin is simply pulled out and a new pin snapped into place, hence the connector 20 would not require time consuming repair. Several other forms of tips are suitable for supplying signals, including pointed tips and knurled ended tips. The programming and testing contacts 6 are soldered to the top of the printed wire board 14 and, except for the ends, are sandwiched between the substrate 12 and the printed wiring board 14.

Figure 2:
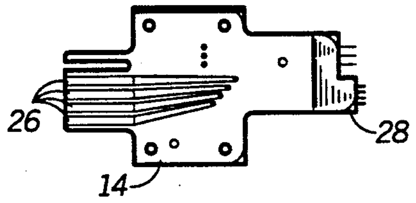
FIG. 2 is a pictorial diagram of a bottom side of a printed wiring board as shown in FIG. 1.

FIG. 2 shows the bottom of the connector 20 as rotated about an axis parallel to a major axis of the connector 20. A plurality of wiring traces 26 are arranged on the bottom of the connector 20 so as to make contact to the cable edge connector. The plurality of wiring traces 26 pass through the printed wiring board 14 to the top side thereof, and are then contacted to the programming and testing pins 8. The printed wiring board 14 includes a chamfered portion 28 opposite the programming and testing pins 6.

When inserting the connector 20 into the access port 2, the programming contacts 6, which extend beyond the power/test pins 8, are first to pass into the access port 2. The chamfered portion 28, which is also tapered, makes the initial entry into the access port 2 resistance free. As the connector 20 is pushed further into the access port 2, the chamfered portion 28 begins to fit more tightly, and in effect, pilots the connector 20 into the access port 2 in both vertical and horizontal directions. The power/test pins 8 are then more easily guided into the access port 2 without damage. Sufficient contact of the programming and testing pins 6 are made to printed wiring traces on the chassis due to a force exerted against the pins as the chamfered portion 28 is forced into the access port 2. The power/test pins 8 make sufficient electrical contact to edge plating on the chassis due to the force exerted, in part, as a result of being spring loaded. The connector 20, then, makes contact to the surface of the chassis for providing testing and programming signals to the selective call receiver 10, and simultaneously makes contact to the edge of the chassis for supplying power and test signals to the selective call receiver 10.

Figure 3:
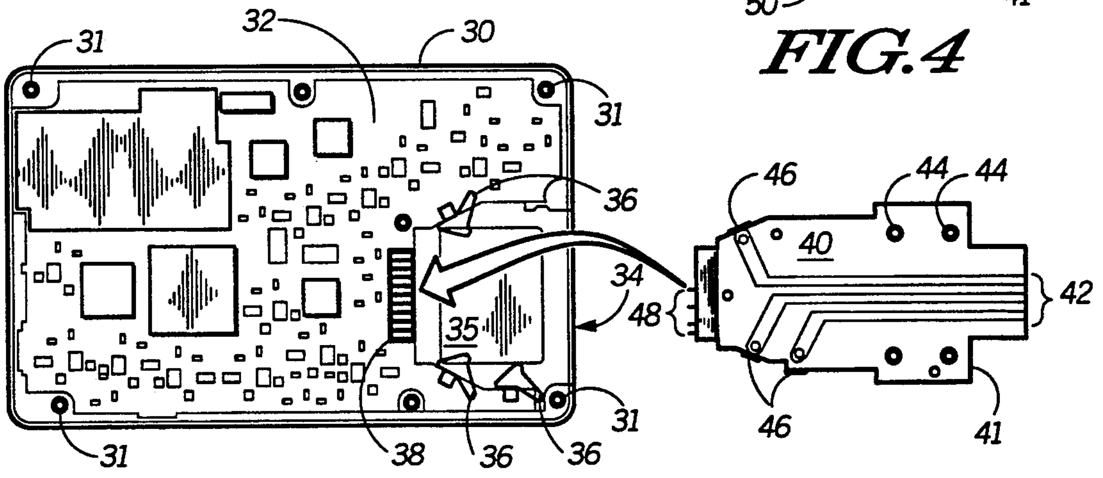
FIG. 3 is a pictorial diagram in accordance with a second embodiment of the present invention.

FIG. 3 depicts a second embodiment of the present invention. A selective call receiver 30 which approximates the size of a credit card is shown with a back thereof removed, and having a chassis 32 housed therein. A battery slot 34 is provided for inserting a battery into a battery cavity 35, wherein the battery contacts battery terminals 36. A plurality of terminals 38 for programming and testing the selective call receiver 30 is located on the chassis 32 just beyond the battery cavity 35. With the battery removed, a connector 40 can be inserted into the battery slot 34, thus residing in the battery cavity 35.

A top side of the connector 40 is shown in FIG. 3 wherein only a top side of a printed wire board 41 is visible. A plurality of screws 44 attach the printed wire board 40 to a substrate 50 (see FIG. 4). A plurality of wire traces 42 are located on the top side of the printed wiring board 41 for providing connection to a ribbon cable edge connector (not shown). The wire traces 42 carry power from the ribbon cable connecter to a plurality of contacts 46. The plurality of contacts 46 connect to the wiring traces 42 on a bottom side of the printed wire board (the wiring traces 42 pass through the printed wire board 41). The result is that the contacts 46 are partially sandwiched between the printed wire board 41 and the substrate 50, and are bent as they exit so as to provide contact surfaces at edges of the printed wire board 41. Hence, when the connector 40 is inserted into the selective call receiver 30, the contacts 46 mate with the battery contacts 36. Alternatively, edge plating could be incorporated on the printed wire board 41.

Figure 4:
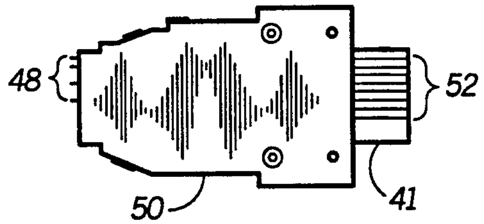
FIG. 4 is a pictorial diagram of a substrate of a connector as shown in FIG. 3.

FIG. 4 depicts the bottom side of the connector 40 with the substrate 50 shown above the bottom side of the printed wire board 41. The substrate 50 is similar in construction to the substrate 12 already described. A portion of the bottom side of the printed wire board is visible, having wire traces 52 provided thereon for contacting the ribbon cable edge connector to receive the programming or testing signals therefrom. Contacts 48 are soldered to the wire traces 52 at the opposite end of the printed wire board 41 (the contacts 48 are typically resilient contacts). The contacts 48 are sandwiched between the substrate 50 and printed wire board 41 with the distal end of the printed wire board 41 being chamfered so as to apply the necessary pressure on the contacts 48, thereby making sufficient electrical contact to the terminals 38.

Depending upon the placement of an antenna which is shown as the first and second sides 11 of the selective call receiver 30, the battery and a battery door will have a substantial affect on the antenna tuning. Referring to FIG. 3, the antenna 11 is electrically and mechanically coupled to the chassis 32 via the screw holes 31 of the selective call receiver 30. This phenomena is known as loading the antenna. The problem presented with such antenna loading occurs when the selective call receiver 30 is RF tuned. Since the battery and the battery door is removed during testing and tuning, any RF tuning and measurements will not accurately reflect the actual selective call receiver 30 performance. To compensate for the absence of the antenna loading due to the battery and battery door, the connector 40 is designed to present the surface area metalization, and other characteristics that accurately simulate the size, shape and loading of the battery. A Zinc-Air battery is used in the selective call receiver 30, for example, a PR2330 as manufactured by Panasonic. This battery is compensated by mounting a ground plane from the battery door, on to the connector 40, while maintaining a substantially equal thickness as the batter/door assembly. A distance substantially equal to the distance from a back plate of the battery/door assembly is also maintained in the connector 40.

Although the present invention has been described in relation to particular embodiments thereof, many other variations and modifications and other uses will become apparent to those skilled in the art. For example, the connectors 20 and 40 could be used in portable or personal electronic devices other than a selective call receiver. Additionally, other materials than described herein may be suitable. Therefore, the present invention is limited only by the claims.

We claim:

1. A connector for insertion into a portable electronic device, said portable electronic device having a radio frequency tuned antenna, a chassis and a battery cavity including battery contacts, said connector having a distal end for contacting said chassis, and a proximal end adapted for connection to a cable, said connector comprising:

- a substrate having a size and a surface area metalization substantially equal to the battery for matching a loading characteristics of the antenna when the battery is removed for programming the portable electronic device;
- a printed wire board attached to said substrate, said printed wire board further comprising:
  - a first plurality of conductors thereon for receiving data signals from said cable;
  - a second plurality of conductors thereon for receiving power signals from said cable;
  - a first plurality of contacts coupled to said first plurality of conductors at the distal end thereof for contacting said chassis; and
  - a second plurality of contacts coupled to said second plurality of conductors at the distal end thereof for contacting said battery contacts.

2. The connector according to claim 1 wherein said first plurality of conductors are located on a top of said printed wire board.

3. The connector according to claim 2 wherein said second plurality of conductors are located on a bottom and a top of said printed wire board.

4. The connector according to claim 3 wherein said first and second plurality of contacts are attached to said first and second plurality of conductors on the top of said printed wire board.

5. The connector according to claim 4 wherein the first plurality of contacts are adapted to contact a top surface of said chassis and said second plurality of contacts are adapted to contact an edge of said chassis.

6. A selective call receiver capable of receiving programming and power signals from an external source through an access port, said selective call receiver comprising:

- a housing having a battery cavity;
- a chassis located within said housing, the chassis having at least a top surface and at least one edge surface;
- a radio frequency tuned antenna coupled to the chassis;
- a connector having a distal end adapted for insertion into the access port for providing the programming and power signals to said chassis therethrough, and having a proximal end adapted for receiving the programming and power signals from a cable, said connector further comprising:
  - a substrate having a top and bottom surface wherein a size and a surface area metalization of said substrate is substantially equal to the battery for matching a loading characteristics of the antenna when the battery is removed for programming the selective call receiver;
  - a printed wire board having a top surface attached to the bottom surface of said substrate, and having a first and second plurality of conductors located thereon for receiving the programming and power signals, respectively;
  - a first plurality of contacts located on said printed wire board at the distal end, and coupled to the first plurality of conductors; and
  - a second plurality of contacts located on said printed wire board and coupled to the second plurality of conductors.

7. The selective call receiver according to claim 6 wherein the access port is located in the battery cavity of said housing.

8. The selective call receiver according to claim 6 wherein the connector further comprises a plurality of sockets connected to said second plurality of conductors.

9. The selective call receiver according to claim 8 wherein the second plurality of contacts are spring loaded, the second plurality of contacts being inserted into said plurality of sockets.

10. The selective call receiver according to claim 9 wherein the second plurality of contacts pass through said substrate, said plurality of second contacts hold said plurality of sockets in place for connection to said printed wire board.

11. The selective call receiver according to claim 10 wherein the first plurality of contacts make an electrical connection to the top surface of said chassis and the second plurality of contacts make an electrical connection to said at least one edge of said chassis when inserted into said port.

12. The selective call receiver according to claim 11 wherein the distal end of said printed wire board is chamfered.

13. A connector for providing programming and power/test signals to a selective call receiver, the selective call receiver having a chassis and an antenna being radio frequency tuned, wherein a proximal end of said connector is adapted for receiving the programming and power/test signals from a cable, and a distal end of said connector for inserting into an access port of said selective call receiver for electrically connecting the programming and power/test signals to said chassis, said connector comprising:

- a substrate having a top surface and a bottom surface, said substrate having a size and a surface area metalization substantially equal to the battery for matching a loading characteristics of the antenna when the battery is removed for programming the selective call receiver;

a printed wire board having a first and second plurality of wire traces, a top surface of said printed wire board attached to said substrate, and having a bottom surface, the distal end being both chamfered and tapered;

a plurality of sockets connected to the first plurality of wire traces on the top surface of said printed wire board, the plurality of sockets being accessible through the opening and removably coupled to the plurality of wire traces;

a plurality of spring loaded contacts being inserted through said substrate and into said plurality of sockets for removing and replacing the second plurality of spring loaded contacts, the plurality of spring loaded contacts making an electrical connection to the edge of said chassis upon inserting said connector into said access port; and a plurality of contacts connected to the second plurality of wiring traces and making an electrical connection to the top surface of said chassis upon inserting said connection into said access port.

14. The connector according to claim 13 wherein the substrate is an insulator.

15. The connector according to claim 14 wherein the plurality of spring loaded contacts are pogo pins.

16. The connector according to claim 15 wherein the plurality of contacts are resilient contacts.

17. The connector according to claim 16 wherein the proximate end of said printed wire board is adapted to receive an edge connector ribbon cable.

* * * * *